United States Patent [19]

Nakanishi et al.

[11] Patent Number: 4,668,024
[45] Date of Patent: May 26, 1987

[54] SOLENOID-OPERATED HYDRAULIC CONTROL DEVICE FOR ANTI-SKID BRAKE SYSTEM

[75] Inventors: Nobuyasu Nakanishi; Masakazu Ishikawa, both of Toyota; Akira Shirai, Toyoake; Yoshihisa Nomura; Noboru Noguchi, both of Toyota; Hirochika Shibata, Kariya, all of Japan

[73] Assignees: Toyota Jidosha Kabushiki Kaisha; Aisin Seiki Kabushiki Kaisha, both of Japan

[21] Appl. No.: 797,134

[22] Filed: Nov. 12, 1985

[30] Foreign Application Priority Data

Nov. 15, 1984 [JP] Japan .................. 59-173665[U]
Jun. 6, 1985 [JP] Japan .................. 60-85315[U]
Jun. 6, 1985 [JP] Japan .................. 60-85316[U]

[51] Int. Cl.$^4$ .............................................. B60T 8/02
[52] U.S. Cl. ................................. 303/119; 251/227; 251/129.02; 251/129.21; 303/116; 303/69
[58] Field of Search ............... 303/119, 61–63, 303/68–69, 15, 113, 114, 115, 116, 117, 118, 92; 188/181 A, 181 R, 181 C; 138/40, 42, 44, 45, 89; 137/513.5; 251/117, 129.02, 129.21

[56] References Cited

U.S. PATENT DOCUMENTS

| 3,431,028 | 3/1969 | Yoder ............................ 251/117 X |
| 3,550,966 | 12/1970 | Leiber ............................ 303/119 |
| 3,677,300 | 7/1972 | King ............................ 138/40 X |
| 3,719,401 | 3/1973 | Peruglia ........................ 303/119 |
| 3,724,502 | 4/1973 | Hayner et al. .................. 138/44 X |
| 3,866,983 | 2/1975 | Kondo ............................ 303/119 |
| 3,893,693 | 7/1975 | Skoyles ............................ 303/119 |
| 4,050,749 | 9/1977 | Harries et al. .................. 303/119 |
| 4,090,739 | 5/1978 | Iio ............................ 303/119 X |
| 4,561,701 | 12/1985 | Fujii et al. .................... 303/119 |
| 4,576,204 | 3/1986 | Smallhorn et al. ............... 138/40 X |

FOREIGN PATENT DOCUMENTS 2242746 8/1972 Fed. Rep. of Germany ...... 303/119
56-142733 11/1981 Japan .
58-224839 12/1983 Japan .

Primary Examiner—Douglas C. Butler
Attorney, Agent, or Firm—Parkhurst & Oliff

[57] ABSTRACT

A hydraulic control device for an anti-skid brake system for a vehicle, including a solenoid-operated directional control valve for communication of a pressure chamber in a hydraulic actuator, selectively with a hydraulic power source and a reservoir, and a solenoid-operated flow control valve disposed between the directional control valve and one of the pressure chamber, hydraulic power source and reservoir, the hydraulic control device being operated to effect rapid and slow rise and fall of a pressure in the hydraulic actuator, in response to a slip ratio of a wheel of the vehicle. The flow control valve comprises a flow restrictor which permits a restricted flow of a fluid through the valve even when its valving member is seated on a valve seat in which a valve hole is open. The flow restrictor is provided in one of various forms except an ordinary orifice with a small diameter. The flow restrictor may be a groove formed in an end face of a valving member opposite to the valve seat, a rough or ragged surface of the valve seat or valving member, or a porous structure formed on the valving member so as to contact the valve seat. Alternatively, the flow restrictor may be formed by a porous structure which fills a hole formed in parallel with the valve hole which is open in the valve seat.

11 Claims, 11 Drawing Figures

SOLENOID-OPERATED HYDRAULIC CONTROL DEVICE FOR ANTI-SKID BRAKE SYSTEM

BACKGROUND OF THE INVENTION

1. Field of the Art

The present invention relates to a solenoid-operated hydraulic control device for an anti-skid brake system for a vehicle, to directly or indirectly control a pressure of a fluid in a brake cylinder.

2. Related Art Statement

An anti-skid hydraulic brake system for a vehicle is known. For example, Japanese Patent Application laid open in 1983 under Publication No. 58-224839, discloses an anti-skid device of indirect pressure control type wherein a pressure of a brake fluid in a brake cylinder is indirectly controlled by a pressure regulator which is operated by a fluid delivered from a pressure source which is different from a pressure source for the brake cylinder. Further, Japanese Patent Application laid open in 1981 under Publication No. 56-142733 discloses an anti-skid device of direct pressure control type wherein a solenoid-operated hydraulic control device is disposed in a primary fluid passage which connects a master cylinder and a brake cylinder.

A solenoid-operated hydraulic control device is provided to control a pressure of a fluid in a pressure chamber of a hydraulically operated actuator, for example, a pressure regulator when the control device is used in an anti-skid device of indirect pressure control type, or a brake cylinder when the control device is used in an anti-skid device of direct pressure control type.

An example of the solenoid-operated hydraulic control device consists of a combination of a solenoid-operated directional control valve and a solenoid-operated flow control valve. The directional control valve is electromagnetically operated between a first position for communication of the pressure chamber in the hydraulic actuator with a hydraulic power source such as a master cylinder or a pump, and a second position for communication of the pressure chamber in the actuator with a reservoir. The fluid from the pressure source may be fed into the hydraulic actuator when the directional control valve is placed in the first position. In the second position, the fluid in the hydraulic actuator may be discharged into the reservoir. The flow control valve is disposed between the directional control valve and the hydraulic actuator whose pressure is controlled by the hydraulic control device. The flow control valve has a restrictor passage for restricting a flow of the fluid through the valve, and a non-restrictor passage formed in parallel with the restrictor passage. The flow control valve is electromagnetically operated between a non-restricting position in which the fluid flows through both of the restrictor passage and the non-restrictor passage, and a flow-restricting position in which the non-restrictor passage is closed and the fluid is forced to flow through the restrictor passage. Thus, the flow control device is capable of controlling a rate of flow of the fluid therethrough in two steps.

The abovementioned solenoid-operated hydraulic control device consisting of the solenoid-operated directional control and flow control valves is capable of effecting a pressure regulating operation in four modes which permit a rapid rise, a rapid fall, a slow rise and a slow fall, respectively, of the pressure in the hydraulic actuator. Thus, the pressure in the hydraulic actuator may be suitably regulated so as to be held within an optimum range.

PROBLEM SOLVED BY THE INVENTION

In such solenlid-operated hydraulic control device as introduced above, the flow restrictor is formed by a conventional orifice having a small diameter to provide a resistance to flow of the fluid. However, there is a possibility that such an orifice is clogged or plugged with foreign substances contained in the working fluid. For this reasons, suitable means such as an oil filter should be provided to prevent the orifice from being clogged, and considerable cares should be taken in designing such preventive means.

SUMMARY OF THE INVENTION

It is accordingly an object of the present invention to provide a solenoid-operated hydraulic control device wherein a flow control valve has a flow restrictor which undergoes a minimum variation in its flow restriction due to clogging thereof.

According to the present invention, there is provided a hydraulic control device for an anti-skid hydraulic brake system having a hydraulic actuator such as a brake cylinder for applying a brake to a wheel of a vehicle or a regulator for regulating a pressure in the brake cylinder, the hydraulic control device including a solenoid-operated directional control valve for communication of a pressure chamber in the hydraulic actuator, selectively with a hydraulic power source and a reservoir, and further including a solenoid-operated flow control valve disposed between the directional control valve and one of the pressure chamber, the hydraulic power source and the reservoir, to control a flow of a fluid in two steps, the hydraulic control device being operated to effect rapid rise and fall, and slow rise and/or fall of a pressure in the pressure chamber, in response to a slip ratio of the wheel, the solenoid-operated flow control valve comprising: (a) means for defining a valve hole; (b) a valve seat in which the valve hole is open; (c) a valving member movable between its first position in which the valving member is seated on the valve seat, and its second position in which the valving member is spaced apart from the valve seat; (d) a solenoid which is energized and deenergized for moving the valving member between the first and second positions; and (e) a flow restrictor provided on one of the valve seat and the valving member, permitting a predetermined rate of restricted flow of the fluid through the valve hole while the valving member is placed in the first position, the predetermined rate of restricted flow being smaller than a rate of flow of the fluid while the valving member is placed in the second position.

As described above, the solenoid-operated flow control valve may be disposed between the solenoid-operated directional control valve and the hydraulic power source or the reservoir, as well as between the directional control valve and the hydraulic actuator. In the case where the flow control valve is disposed between the directional control valve and the hydraulic actuator, the rate of flow of the fluid into the pressure chamber of the hydraulic actuator, and the rate of flow of the fluid from the pressure chamber of the hydraulic actuator, may be changed in two steps, whereby the pressure in the pressure chamber of the hydraulic actuator may be controlled in four different modes, that is, for a rapid rise, a rapid fall, a slow rise and a slow fall of the pressure, respectively. Where the flow control valve is disposed between the directional control valve and the hydraulic power source, only the rate of flow of the fluid into the pressure chamber of the hydraulic actuator may be changed in two steps, whereby the pressure in the hydraulic actuator may be controlled in three different modes for rapid rise and fall and a slow rise of the pressure. In the case where the flow control valve is disposed between the directional control valve and the reservoir, the pressure in the hydraulic actuator may be controlled in three different modes corresponding to rapid rise and fall and a slow fall of the pressure.

In the hydraulic control device of the present invention as previously described, the flow restrictor permits a restricted flow of the fluid through the valve hole at a predetermined limited rate even while the valving member is seated on the valve seat. Thus, the rate of fluid flow through the flow control valve may be controlled in two steps. The flow restrictor replaces an orifice having a small diameter, which is essential to a flow control valve of a conventional hydraulic control device. Therefore, the flow restrictor of the flow control valve of the present hydraulic control device eliminates the need of forming such an orifice, and allows an easy manufacture of the control device. In this connection, it is noted that the conventional orifice should be formed with a diameter of about 0.1 mm, for example, if it is desired to achieve a slow rise of a pressure at a rate of 50 kg/cm$^2$/sec. where the pressure of the hydraulic power source is 100 kg/cm$^2$. An orifice having such a small diameter is considerably difficult to be formed.

According to one preferred form of the hydraulic control device of the invention, the flow restrictor comprises at least one groove formed in a contact surface of one of the valving member and the valve seat when the valving member is placed in the its first position.

According to another preferred form of the hydraulic control device, the flow restrictor comprises one of contact surfaces of the valving member and the valve seat which contact each other while the valving member is in its first position. This one of the contact surfaces is formed with minute indentations and/or projections which provide gaps between the contact surfaces while the valving member is in the first position. In either one of the above two cases, a filter or other means for preventing the flow restrictor from being clogged may be made relatively simple. If the groove in the contact surface of the valving member or the gaps between the valve seat and the valving member is/are clogged with foreign substances, these substances may be readily washed away with a flow of the fluid after the valving member is moved off the valve seat.

In accordance with a further preferred form of the hydraulic control device, the flow restrictor is constituted by a porous structure which forms at least end portion of the valving member which contacts the valve seat while the valving member is placed in the first position, the porous structure having an infinite number of minute continuous pores. In this case, a partial or local clogging of the porous structure will not have a significant effect on a flow rate of the fluid through the porous structure. Further, if a mass of foreign substances of comparatively large size sticks to the porous structure of the flow restrictor, the sticking mass may be removed with a flow of the fluid after the valving member is unseated from the valve seat.

According to the present invention, there is also provided a hydraulic control device for an anti-skid hydraulic brake system having a hydraulic actuator such as a brake cylinder for applying a brake to a wheel of a vehicle, or a regulator for regulating a pressure in the brake cylinder, the hydraulic control device including a solenoid-operated directional control valve for communication of a pressure chamber in the hydraulic actuator, selectively with a hydraulic power source and a reservoir, and further including a solenoid-operated flow control valve disposed between the directional control valve and one of the pressure chamber, the hydraulic power source and the reservoir, the flow control valve having a restrictor passage and a non-restrictor passage formed in parallel with each other, and controlling a rate of flow of a fluid therethrough in two steps by opening and closing the non-restrictor passage, the hydraulic control device being operated to effect rapid rise and fall and slow rise and fall of a pressure in the pressure chamber, in response to a slip ratio of the wheel, the solenoid-operated directional control valve comprising: means for defining a hole in parallel with the non-restrictor passage; and a porous structure filling the hole and having an infinite number of minute continuous pores, the porous structure cooperating with the means for defining a hole, to define the restrictor passage.

In the above-described hydraulic control device wherein the restrictor passage is provided by the hole filled with the porous structure with many continuous pores, an effect of flow restriction of the restrictor passage as a whole will not be significantly changed even if the porous structure is partially or locally clogged with foreign substances. Accordingly, the hydraulic control device is effectively protected against abnormal functioning due to clogging of the restrictor passage.

The porous structure of the restrictor passage may preferably be a multi-layer laminar structure consisting of a central dense layer having fine pores, and a pair of coarse layers which sandwich the central dense layer and have coarse pores of sizes larger than the fine pores. The laminar structure is positioned in the hole so that the fluid flows in directions substantially perpendicular to the layers of the structure. In the case, the central dense layer functions primarily for restricting the fluid flow, while the outer coarse layers serve primarily as a filter, thereby more effectively avoiding a variation in the flow restriction of the restrictor passage due to its clogging. The porous structure may be formed of a sintered alloy. In particular, a multi-layer porous structure of a sintered alloy is preferred.

As described hitherto, the flow control valve of the hydraulic control device constructed according to the present invention comprises a flow restrictor or restrictor passage which permits a restricted flow of the fluid through the flow control valve even while the flow control valve is placed in its positions in which the valve hole or non-restrictor passage is closed. The flow restrictor or restrictor passage is formed by various means except an ordinary orifice having a small diameter. In this respect, the term "orifice" is interpreted in a comparatively narrow sense, namely, interpreted to mean a single small aperture or passage which is defined by a single member.

BRIEF DESCRIPTION OF THE DRAWING

The foregoing and optional objects, features and advantages of the present invention will become more apparent from reading the following detailed description of preferred embodiments of the invention, when considered in conjunction with the accompanying drawing, in which.

DETAILED DESCRIPTION OF THE PREFERRED EMBODIMENTS

The preferred embodiments of the present invention will be described in detail, with reference to the accompanying drawing.

Figure 1:
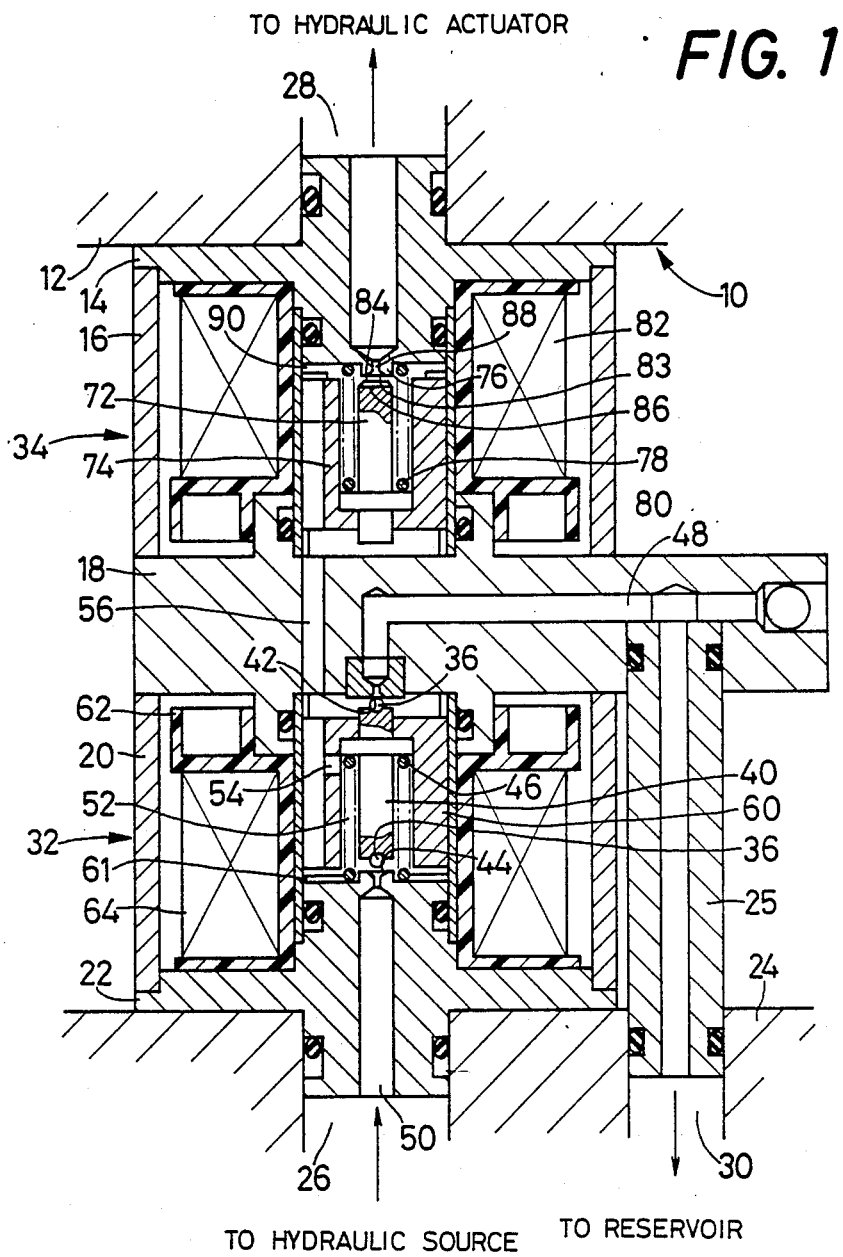
FIG. 1 is a front elevational view in cross section of one embodiment of a solenoid-operated hydraulic control device of the invention.

Referring to FIG. 1, reference numeral 10 designates a housing for a hydraulic control device. For easy manufacture, this housing 10 is made up of a plurality of members which include elements 12, 14, 16, 18, 20, 22, 24 and 25. These elements are assembled into a unitary housing structure which functions as the housing 10. The housing 10 has: a port 26 connected to a hydraulic power source such as a master cylinder or a pump of a hydraulic system; a port 28 connected to a brake cylinder, regulator, or other unit which is controlled by the hydraulic control device; and a port 30 connected to a reservoir of the hydraulic system. The housing 10 further incorporates a solenoid-operated directional control valve 32 for selective communication of the port 28 with the port 26 or the port 30, and a solenoid-operated flow control valve 34 for regulating an amount of flow of a hydraulic working fluid through the port 28, in two steps.

The directional control valve 32 includes a plunger 40 which has two balls 36, 38 on its opposite ends, respectively. The balls 36, 38 serve as valving members which are positioned opposite to corresponding valve seats 42, 44 formed on the housing 10. The plunger 40 is axially biased by a compression coil spring 46 toward the valve seat 42. In this arrangement, therefore, the ball 36 is normally held seated on the valve seat 42 so as to close a passage 48 leading to the port 30, while the other ball 38 is held away from the valve seat 44 so that a passage 50 leading to the port 26 is held open. The passage 50 communicates with a fluid passage 56 through a plunger chamber 52 and a communication port 54.

The above-indicated plunger 40 is supported by a hollow piston 60 made of a magnetic material. The hollow piston 60 is axially slidably received within a piston chamber 61. Radially outwardly of and coaxially with the hollow piston 60, there is disposed a solenoid (first solenoid) 64 with a coil wound on a bobbin 62 made of a resin. With the solenoid 64 energized, the hollow piston 60 is moved with magnetic attraction in a downward direction as viewed in FIG. 1, whereby the plunger 40 is moved against a biasing force of the spring 46. As a result, the ball 36 is moved away from the corresponding valve seat 42, while the ball 38 is seated on the valve seat 44. Namely, the energization of the solenoid 64 will cause the directional control valve 32 to be switched from its position for communication of the passage 56 with the port 26, to its position for communication of the passage 56 with the port 30.

The previously indicated flow control valve 34 includes a plunger 72, a piston 74 for supporting the plunger 72, a compression coil spring 78 for biasing the plunger 72 in a direction away from a valve seat 76, a solenoid (second solenoid) 82 wound on a bobbin 80, and other elements. The flow control valve 34 is almost similar in construction to the directional control valve 32, except that the plunger 72 is biased in a direction opposite to the biasing direction of the plunger 40, so that the plunger 72 is held away from the valve seat 76, and that the plunger 72 has no ball fixed at its ends. More specifically, the plunger 72 has a contact surface 84 on its end opposite to a contact surface 83 of the valve seat 76, so that the sealing surface 84 may be seated on the contact surface 83. The contact surface 84 has a U-shaped groove 86 formed in a diametric direction. The contact surface 84 having this U-shaped groove 86 cooperates with the opposite contact surface 83 to define a flow restrictor which communicates with a valve hole 88 and a piston chamber 90, even when the plunger 72 is seated on the valve seat 76. The cross sectional area of the U-shaped groove 86 is determined so that the flow restrictor formed upon seating of the plunger 72 on the valve seat 76 permits a predetermined small amount (low rate) of flow of the working fluid therethrough.

Figure 2:
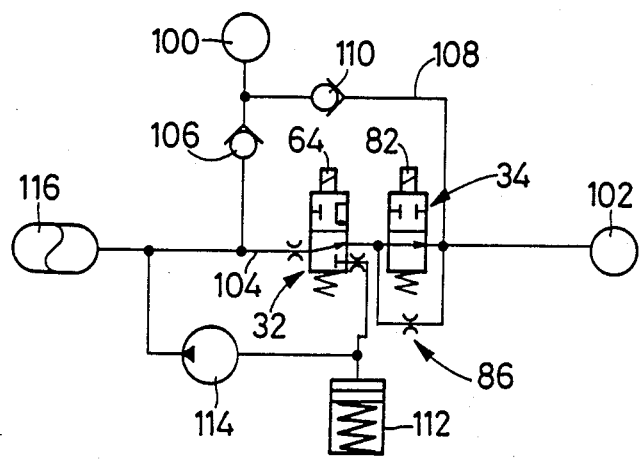
FIGS. 2 and 3 are diagrammatic views of two different hydraulic brake systems in which the hydraulic control device of FIG. 1 is incorporated.

The solenoid-operated hydraulic control device which has been described is applied, for example, to a hydraulic brake system shown in FIG. 2. In this example, the solenoid-operated directional control and flow control valves 32, 34 constituting the hydraulic control device are disposed in a primary fluid passage 104 which connects a master cylinder 100 and a brake cylinder 102. The primary fluid passage 104 is provided with a check valve 106. Further, the hydraulic brake system has a by-pass passage 108 which by-passes the check valve 106, and the directional and flow control valves 32, 34. In the by-pass passage 108, there is disposed a check valve 110 which permits the fluid to flow in a direction opposite to the direction of the fluid flow permitted by the check valve 106.

A reservoir 112 is connected to the directional control valve 32. The working fluid in the reservoir 112 is pumped by a pump 114 and is delivered to an accumulator 116 for storage therein. As is apparent from the foregoing description, the hydraulic system shown in FIG. 2 serves as a hydraulic anti-skid brake system of direct pressure control type which comprises: a hydraulic power source constituted by the master cylinder 100, pump 114, accumulator 116, etc.; a hydraulic actuator in the form of the brake cylinder 102, whose operating pressure is controlled by the solenoid-operated hydraulic control device; and a fluid tank in the form of the reservoir 112.

The solenoid-operated direction control valve 32 and the solenoid-operated flow control valve 34 are normally placed in the positions of FIG. 2. In these positions, the hydraulic brake fluid pressurized by the master cylinder 100 upon application of a brake is delivered through the primary fluid passage 104 to the brake cylinder 102 via the check valve 106, and the directional and flow control valves 32, 34 which are disposed in the passage 104.

With the valves 32, 34 placed in the above-indicated normal positions of FIG. 2, the plunger 72 of the flow control valve 34 is held apart from the valve seat 76, and consequently the valve hole 88 is kept open, as indicated in FIG. 1. In this condition, the fluid may flow into the brake cylinder 102 at a sufficiently high flow rate, whereby there is a minimum time lag between the activation of the master cylinder 100 and the actual application of the brake by the brake cylinder 102.

When the braking pressure in the brake cylinder 102 is relatively low in relation to a coefficient of friction of a road surface, an anti-skid device of the hydraulic brake system is not activated, and the directional and flow control valves 32, 34 are held in the positions of FIG. 2. Upon releasing the brake, the fluid in the brake cylinder 102 is released mainly through the by-pass passage 108, and is returned to the master cylinder 100.

Figure 4:
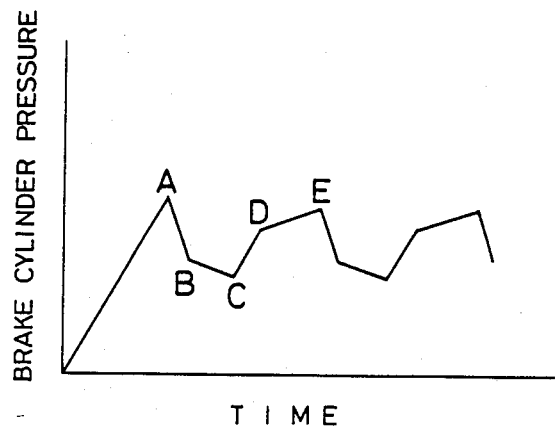
FIG. 4 is a graphical representation illustrating a variation in pressure in a brake cylinder of the hydraulic brake system of FIG. 2, during a control of the brake cylinder pressure by the hydraulic control device of FIG. 1.

When the braking pressure in the brake cylinder 102 has been raised beyond an upper limit in relation to the coefficient of friction of the road surface, an amount of slip of a vehicle's drive wheel for which the brake cylinder 102 is provided, exceeds a predetermined upper limit, whereby the solenoid 82 is energized by a controller (not shown) in response to a signal from a sensor (not shown) which has detected an excessive slip ratio of the drive wheel. As a result, the flow control valve 32 is activated for communication of the brake cylinder 102 with the reservoir 112. Thus, the brake fluid in the brake cylinder 102 is permitted to be discharged therefrom into the reservoir 112, whereby the pressure in the pressure chamber in the brake cylinder 102 is lowered. If the controller judges at this time that it is necessary to rapidly reduce the brake pressure in the brake cylinder 102, the solenoid 82 for the flow control valve 34 is held deenergized, so that the valve 34 permits the fluid to flow through the valve hole 88 into the reservoir 112 at a sufficiently high rate. However, if the controller judges that the pressure in the brake cylinder 102 should fall at a slow rate, the solenoid 82 is energized to cause the plunger 72 to be seated on the valve seat 76, whereby the fluid is forced to flow through the flow restrictor formed by the U-shaped groove 86, and thus the rate of flow of the fluid into the reservoir 112 is reduced. In this case, therefore, the pressure in the brake cylinder 102 falls first at a relatively high rate as indicated by a segment AB in FIG. 4, and then at a relatively low rate as indicated by a segment BC.

The brake fluid fed into the reservoir 112 is pumped up by the pump 114 and stored in the accumulator 116. Hence, if the slip ratio of the drive wheel has been reduced below the upper limit as a result of the fall of the pressure in the brake cylinder 102 as described above, and the controller operates to deenergize the solenoid 64 for the directional control valve 32, the highly pressurized fluid stored in the accumulator 116 is allowed to be fed into the brake cylinder 102. If if is required to rapidly raise the pressure in the brake cylinder 102, the solenoid 82 for the flow control valve 34 is deenergized to permit the fluid to flow into the brake cylinder 102 at a high rate through the valve hole 88. On the other hand, if the braking pressure should be raised at a slow rate, the plunger 72 is seated on the valve seat 76 so that the fluid is forced to flow through the flow restrictor formed by the U-shaped groove 86, and the fluid is fed into the brake cylinder 102 at a relatively low rate. In this case, therefore, the pressure in the brake cylinder 102 is raised first at a high rate as indicated by a segment CD of FIG. 4, and then at a slow rate as indicated by a segment DE.

Even in the event that the flow restrictor formed by the U-shaped groove 86 is clogged or plugged with foreign matters during flows of the fluid therethrough for relatively slow rise or fall of the pressure in the brake cylinder 102, the foreign matters plugging the restrictor passage are removed by a flow of the fluid when the plunger 72 is unseated from the valve seat 76 and the U-shaped groove 86 is uncovered or opened. Thus, the operating reliability of the flow control valve 34 and consequently of the solenoid-operated hydraulic control device is improved, and an oil filter or other means required for preventing the flow restrictor from being clogged, may be made simpler than required in a conventional arrangement.

Figure 3:
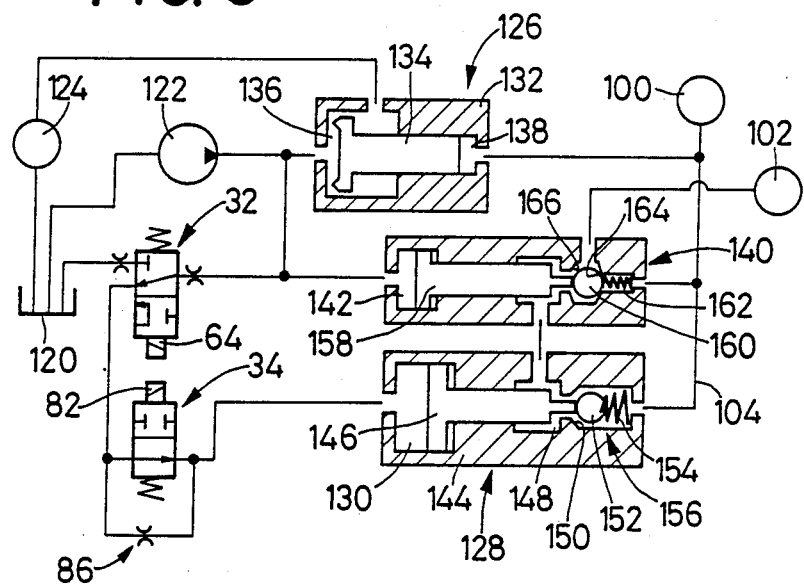

Referring next to FIG. 3, there is shown another example of a hydraulic system in which the solenoid-operated hydraulic control device is incorporated. This hydraulic system provides a hydraulic anti-skid brake system of indirect pressure control type, wherein the pressure in the brake cylinder 102 is indirectly controlled by means of a pressure of a working fluid which is pumped form a reservoir 120 by a pump 122 and supplied to another hydraulically operated actuator such as a power steering unit 124. The solenoid-operated hydraulic control device consisting of the directional and flow control valves 32, 34 is disposed between a first regulator 126 and a second regulator 128. The pressure in a power pressure chamber 130 in the second regulator 128 is controlled by the fluid whose pressure has been regulated by the first regulator 126.

The first regulator 126 has a pressure regulating piston 134 which is slidably and fluid-tightly fitted in a housing 132. On axially opposite sides of the piston 134, there are formed a power pressure chamber 136, and a brake pressure chamber 138. A pressure-receiving surface on one end of the piston 134 exposed to the power pressure chamber 136 is selected to be greater than a pressure-receiving surface on the other end exposed to the brake pressure chamber 138. The brake pressure chamber 138 receives the fluid from the master cylinder 100. In this arrangement, the pressure in the power chamber 136 is lower than the pressure in the master cylinder 100, and is increased in response to an increase in the pressure in the master cylinder 100. The pressure in the power pressure chamber 136 is hereinafter referred to as "power pressure". This power pressure is applied to the power pressure chamber 130 of the second regulator 128 through the solenoid-operated hydraulic control device 32, 34 provided according to the present invention. The power pressure in the power pressure chamber 136 is also applied to a power pressure chamber 142 of a by-pass valve 140.

As in the hydraulic system of FIG. 2, the master cylinder 100 is connected to the brake cylinder 102 via the primary fluid passage 104. The second regulator 128 is disposed in this primary fluid passage 104. The second regulator 128 has a pressure regulating piston 146 which is slidably and fluid-tightly received in a housing 144. The piston 146 receives at its one end the power pressure in the previously indicated power pressure chamber 130, and at its other end a pressure in a brake pressure chamber 148. The piston 146 operated with these pressures is adapted to open and close a shut-off valve 156 which comprises a valve seat 150, ball 152 and a compression coil spring 154. Further, the piston 146 is adapted to change the volume of the brake pressure chamber 148, and thereby regulate the power pressure in the brake pressure chamber 148 based on the pressure in the power pressure chamber 130.

The by-pass valve 140 has a piston 158 which holds a ball 160 seated on a valve seat 164 against a biasing action of a compression coil spring 162, as long as the power pressure is applied to the power pressure chamber 142, whereby the the pressure regulated by the second regulator 128 is applied to the brake cylinder 102. However, if the power pressure is not applied to the power pressure chamber 142, the ball 160 is seated on a valve seat 166 by the biasing force of the spring 162, and consequently the brake fluid from the master cylinder 100 is permitted to be fed into the brake cylinder 102 through the by-pass valve 140, while by-passing the second regulator 128.

The solenoid-operated hydraulic control device consisting of the directional and flow control valves 32, 34 is connected to: a hydraulic power source comprising the pump 122 and the first regulator 126; a hydraulic actuator in the form of the second regulator 128; and the reservoir 120. The solenoids 64 and 82 are suitably controlled under the control of a controller (not shown) which detects an amount of slip (slip ratio) of the vehicle's drive wheel according to a signal generated from a sensor (not shown), whereby the pressure in the power pressure chamber 130 of the second regulator is controlled. Based on the pressure in the power pressure chamber 130, the second regulator 128 controls the pressure in the brake pressure chamber 148, and consequently controls the braking pressure in the brake cylinder 102.

In this anti-skid hydraulic brake system, too, foreign matters which would clog or plug the flow restrictor formed by the U-shaped groove 86 during flows of the fluid therethrough for slow rise or fall of the pressure in the brake cylinder 102, may be removed by a flow of the fluid when the plunger 72 is unseated from the valve seat 76 and the U-shaped groove 86 is uncovered or opened. Thus, the operating reliability of the flow control valve 34 and consequently of the solenoid-operated hydraulic control device is improved.

While there have been described the preferred embodiment of the solenoid-operated hydraulic control device and the two typical applications thereof, the flow restrictor may be provided in other forms.

For example, the flow restrictor formed by the U-shaped groove 86 in the contact surface 84 of the plunger 72 may be replaced by a U-shaped groove which is formed in the valve seat 76. In this intance, too, the same effect as obtained from the groove 86 is expected.

Figure 11:
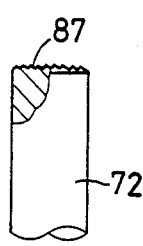
FIG. 11 is a fragmentary front elevational view of a plunger usable in place of the plunger used in the embodiment of FIG. 1.

A flow restrictor may also be provided by forming the contact surface 84 of the plunger 72 or the contact surface 83 of the valve seat 76 with minute indentations or projections, as exaggeratedly indicated at 87 in FIG. 11, so that there exist small gaps between the contact surfaces 84, 83 when the plunger 72 is seated on the valve seat 76. These small gaps serve as a flow restrictor which allows a predetermined limited flow of the fluid therethrough. The contact surface 84, 83, which may be formed with such indentations or projections 87, may be made rough or ragged, by means of etching, shotblast, or other suitable methods. The intended degree of flow restriction may be attained by adjusting the surface roughness of the contact surface 84, 83.

Figure 5:
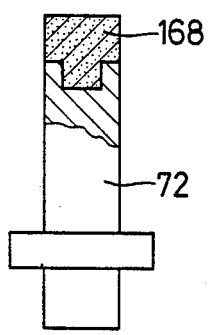
FIG. 5 is a front elevational view partly in cross section of a plunger of another embodiment of a solenoid-operated flow control valve of another embodiment of a solenoid-operated hydraulic control device of the invention.

Another alternative flow restrictor means is illustrated in FIG. 5, wherein the end portion of the plunger 72 opposite to the valve seat 76 is constituted by a porous piece 168 which is formed, for example, of a porous sintered alloy. The porous structure of the porous piece 168 has an infinite number of minute continuous pores (which are too small to be visible, and are therefore not indicated in FIG. 5) which allow a predetermined restricted rate of flow of the fluid therethrough.

Figure 6:
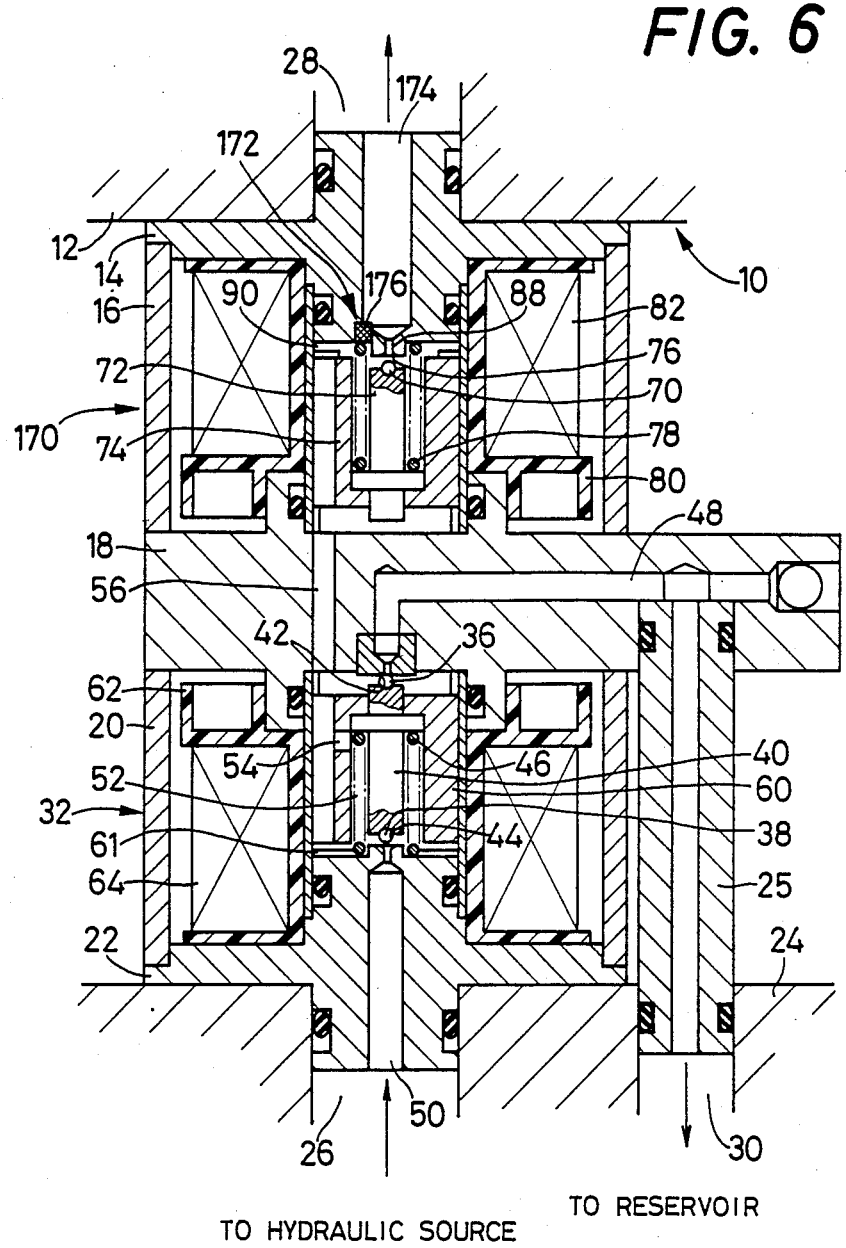
FIG. 6 is a front elevational view in cross section of a further embodiment of solenoid-operated hydraulic control device of the invention.

Referring next to FIG. 6, a modified embodiment of the solenoid-operated hydraulic contol device will be described.

This modified embodiment is different from the preceding embodiment in the construction of the flow control valve. That is, the embodiment of FIG. 6 uses a solenoid-operated flow control valve 170 wherein the plunger 72 has a ball 70 fixed at its one end opposite to the valve seat 76, so that the ball 70 may be seated on the valve seat 76. The piston chamber 90 communicates with the fluid passage 56, and at the same time with the port 28 through a flow restrictor 172 (restrictor passage) and a fluid passage 174. The flow restrictor 172 is disposed in parallel with the valve hole 88 which communicates with the fluid passage 174. The valve hole 88 has a diameter large enough to permit a sufficiently greater amount of flow of the fluid, as compared with the flow restrictor 172. This valve hole 88 is open in the previously indicated valve seat 76.

The ball 70 is normally held apart from the valve seat 76 by a biasing force of the spring 78, so as to permit the fluid from the passage 56 to flow into the fluid passage 174 through both of the flow restrictor 172 and the valve hole 88. When the piston 74 is moved in an upward direction (in FIG. 6) upon energization of the solenoid 82, the ball 70 is seated on the valve seat 76 and closes the valve hole 88. In this condition, therefore, the fluid is forced to flow through only the flow restrictor 172.

The flow restrictor 172 is formed by a second hole formed in the housing 10 in parallel with the valve hole 88, and a porous structure in the form of a sintered piece 176 which is press-fitted in the second hole. The sintered piece 176 has a porous structure which is produced by sintering a formed mass of powder of suitable materials such as metal and ceramics. Since the porous structure of the sintered piece 176 has a network of an infinite number of minute passages, the sintered piece 176 performs substantially the same function as a conventionally used orifice. In this arrangement, a substantive portion of the fluid which flows into the fluid passage 174 flows through the valve hole 88, and a very small amount of the fluid flows through the sintered piece 176. Accordingly, there is a very low possibility of the sintered piece 176 being plugged by foreign substances if contained in the fluid. Further, the flow restricting capability of the sintered piece 176 will not be significantly changed even if a part of the porous structure is plugged with foreign matters. Thus, the sintered piece 176 may serve its intended flow restricting function for a long period of time, and assures a reliable operation of the flow control valve 170 and consequently of the solenoid-operated hydraulic control device as a whole.

The abovementioned solenoid-operated control device of FIG. 6 may be used in anti-skid hydraulic brake systems as illustrated in FIGS. 2 and 3, and may be operated in the same manners as previously described.

Figure 7:
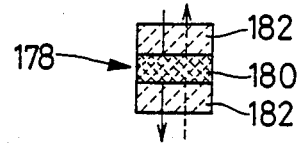
FIG. 7 is a cross sectional view of a sintered piece used in a still further embodiment of the invention.

While the flow control valve 170 of this modified embodiment uses the sintered piece 176 as a flow restrictor, the sintered piece may be replaced by a sintered piece 178 of porous structure shown in FIG. 7. This modified form of the sintered piece 178 has a multi-layer laminar structure which consists of a central dense layer 180 having comparatively fine pores, and a pair of coarse layers 182, 182 which sandwich the central dense layer 180 and have comparatively large pores. The sintered piece 178 is positioned relative to the flow control valve 170, such that the line of fluid flows through the sintered pieces 178 is substantially perpendicular to the layers 180, 182, 182 of the laminar structure. The central dense layer 180 primarily functions to restrict the fluid flows, while the outer coarse layers 182, 182 functions mainly as filters for protecting the central dense layer 180 from being plugged with foreign substances, and further minimizing a variation in the flow restriction by the sintered piece 178 due to the plugging.

The porous structure of the sintered piece used may be made of a suitable synthetic resin. While the sintered piece 176, 178 are produced separately from the housing 10 of the hydraulic control device, it is possible that the housing 10 may be formed with a sintered porous piece such that the porous piece fills a hole provided in the housing for flow restriction. At any rate, the porous piece should eventually fills such a hole formed in the housing.

Like the flow control valve 34 of the preceding embodiment, the flow control valve 170 of the modified embodiment is adapted to be normally held open allowing the fluid to flow through the valve hole 88. Therefore, the amount of the fluid which flows through the flow restrictor 176, 178 is effectively reduced for minimizing the possibility of clogging of the sintered porous structure of the restrictor. However, the flow control valve 34 may be used in a solenoid-operated hydraulic control device in which the valve hole 88 is normally closed. In this case, the feature of the porous structure that a partial or local clogging thereof will not cause a variation in the flow restriction, may be effectively utilized.

Figure 8:
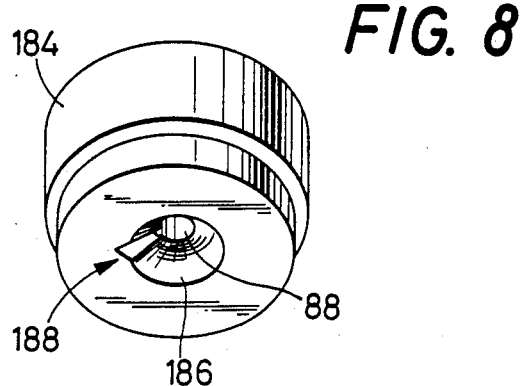
FIGS. 8-10 are views illustrating yet another embodiment of the invention.
Figure 9:
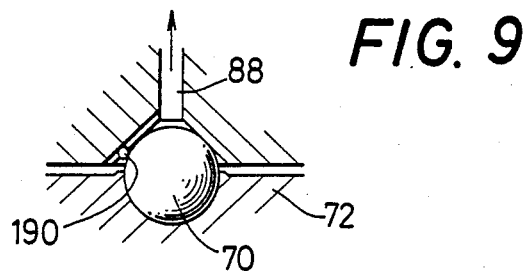
Figure 10:
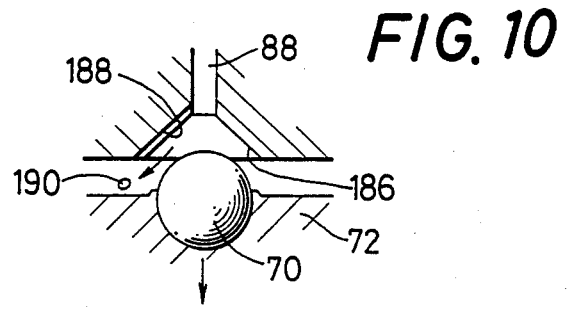

While the embodiments of FIGS. 6 and 7 use the sintered piece 176 or 178 as a flow restrictor which permits a restricted flow of the fluid even when the ball 70 is seated on the valve seat 76, it is possible to modify the flow control valve 170, as illustrated in FIGS. 8, 9 and 10. In this modified embodiment, the sintered piece 176, 178 is eliminated, and a valve seat member 184 having the valve hole 88 and fixed to the housing 10 is formed with a valve seat 186 which has a truncated conical shape in cross section as shown in FIGS. 9 and 10. The valve seat 186 is provided with a V-groove 188 which permits a restricted flow of the fluid even while the ball 70 serving as a valving member is seated on the valve seat 186 as indicated in FIG. 9. Thus, the V-groove 188 acts as a flow restrictor. In the event that the V-groove 190 is blocked by a mass of foreign substance 190 as depicted in FIG. 9, this foreign substance mass 190 may be removed by a non-restricted flow of the fluid when the ball 70 is moved off the valve seat 186, as indicated in FIG. 10. It will be understood that the valve seat 186 and the ball 70 of the present modified embodiment serve the same function as the valve seat 83 and the end of the plunger 72 with the U-shaped groove 86 of the first embodiment of FIG. 1.

While the present invention has been described in its preferred embodiments with a certain degree of particularity, it is to be understood that the invention may be embodied with various changes and improvements which may occur to those skilled in the art.

What is claimed is:

1. A hydraulic control device for an anti-skid hydraulic brake system for a vehicle having a hydraulic actuator, for effecting rapid rise and fall and slow rise and fall of a pressure in a pressure chamber in said hydraulic actuator, in response to a slip ratio of a wheel of the vehicle, the hydraulic control device including a solenoid-operated directional control valve for selective connection of said pressure chamber in said hydraulic actuator with a hydraulic power source and a reservoir, and further including a solenoid-operated flow control valve disposed between the directional control valve and one of said pressure chamber, said hydraulic power source and said reservoir, to control a flow of a fluid in two steps, said solenoid-operated flow control valve comprising:

means for defining a valve hole;

a valve seat in which said valve hole is opened;

a valving member movable between a first position in which the valving member is seated on said valve seat, and a second position in which the valving member is spaced apart from said valve seat; and a solenoid which is energized and deenergized for moving said valving member between said first and second positions;

wherein one of the contact surfaces of said valving member and said valve seat which contact each other when said valving member is placed in said first position is formed with minute projections which provide gaps between said contact surfaces while said valving member in said first position is seated on said valve seat, thereby serving as a flow resticter for permitting a predetermined rate of restricted flow of the fluid through said valve hole when said valving member is in said first position, said predetermined rate of restricted flow being less than a rate of flow of the fluid when said valving member is in said second position.

2. A hydraulic control device according to claim 1, wherein said valving member is normally placed in said second position to hold said valve fully open.

3. A hydraulic control device for an anti-skid hydraulic brake system for a vehicle having a hydraulic actuator, for effecting rapid rise and fall and slow rise and fall of a pressure in a pressure chamber in said hydraulic actuator, in response to a slip ratio of a wheel of the vehicle, the hydraulic control device including a solenoid-operated directional control valve for selective connection of said pressure chamber is said hydraulic actuator with a hydraulic power source and a reservoir, and further including a solenoid-operated flow control valve disposed between the directional control valve and one of said pressure chamber, said hydraulic power source and said reservoir, to control a flow of a fluid in two steps, said solenoid-operated flow control valve comprising:

means for defining a valve hole;

a valve seat in which said valve hole is opened;

a valving member movable between a first position in which the valving member is seated on said valve seat, and a second position in which the valving member is spaced apart from said valve seat; and a solenoid which is energized and deenergized for moving said valving member between said first and second positions;

wherein one of contact surfaces of said valving member and said valve seat which contact each other when said valving member is placed in said first position is formed of a porous structure having a large number of minute continuous pores which serve as a flow restrictor for permitting a predetermined rate of restricted flow of the fluid through said valve hole when said valving member is in said first position, said predetermined rate of restricted flow being less than a rate of flow of the fluid when said valving member is in said second position.

4. A hydraulic device according to claim 3, wherein said porous structure forms at least an end portion of said valving member which contacts said valve seat when the valving member is in said first position.

5. A hydraulic control device according to claim 3, wherein said porous structure is formed of a sintered alloy.

6. A hydraulic control device according to claim 3, wherein said valving member is normally placed in said second position to hold said valve fully open.

7. A hydraulic control device for an anti-skid hydraulic brake system for a vehicle having a hydraulic actuator, for effecting rapid rise and fall and slow rise and flow of a pressure in said hydraulic actuator, in response to a slip ratio of a wheel of the vehicle comprising:

a solenoid-operated directional control valve for selective connection of a pressure chamber in said hydraulic actuator, with a hydraulic power source and a reservoir;

a solenoid-operated flow control valve disposed between said directional control valve and one of said pressure chamber, said hydraulic power source and said reservoir;

means for defining a first hole which is opened and closed by said flow control valve;

means for defining a second hole in parallel with said first hole; and a porous structure filling said second hole, and cooperating with said means for defining a second hole, to define a flow restrictor which provides a lower rate of restricted flow of a fluid therethrough, than a rate of restricted flow of the fluid through said first hole, whereby said flow control valve is capable of controlling a rate of flow of the fluid therethrough in two steps by opening and closing said first hole.

8. A hydraulic control device according to claim 7, wherein said porous structure is a laminar structure consisting of a central dense layer having fine pores, and a pair of coarse layers which sandwich said central dense layer and have coarse pores of sizes larger than said fine pores, said laminar structure being positioned in said hole so that the fluid flows in directions substantially perpendicular to said dense and coarse layers.

9. A hydraulic control device according to claim 7, wherein said porous structure is formed of a sintered alloy.

10. A hydraulic control device according to claim 7, wherein said non-restrictor passage is normally held open.

11. A hydraulic control device according to claim 7, further comprising a housing unit in which said directional control valve and said flow control valve are incorporated, said housing unit including said means for defining a first hole and said means for defining a second hole, and further including means for defining a connecting passage for connecting said directional control valve and said flow control valve, and wherein said flow control valve comprises a valve seat in which said first hole is opened, and a valving member to open and close said first hole, said first and second holes being connected to said connecting passage.

* * * * *